United States Patent [19]

Donegan et al.

[11] Patent Number: 5,364,124
[45] Date of Patent: Nov. 15, 1994

[54] AIR BAG ASSEMBLY WITH DEPLOYMENT CHUTE

[75] Inventors: Michael W. Donegan, Bellbrook; John L. Volz, Dayton, both of Ohio; Thomas C. Brown, Bellevue, Ky.

[73] Assignee: General Motors Corporation, Detroit, Mich.

[21] Appl. No.: 967,909

[22] Filed: Oct. 29, 1992

[51] Int. Cl.$^5$ ............................................. B60R 21/22
[52] U.S. Cl. .................................. 280/730 R; 280/732
[58] Field of Search ............... 280/732, 728 R, 728 A, 280/742, 743 R, 743 A, 730 R

[56] References Cited

U.S. PATENT DOCUMENTS

| 4,332,398 | 6/1982 | Smith | 280/732 |
| 4,911,471 | 3/1990 | Hirabayashi | 280/732 |
| 5,072,967 | 12/1991 | Batchelder et al. | 280/732 |
| 5,135,252 | 8/1992 | Suran et al. | 280/728 A X |
| 5,135,253 | 8/1992 | Hirashima et al. | 280/732 |
| 5,160,164 | 11/1992 | Fischer et al. | 280/732 X |
| 5,242,192 | 9/1993 | Prescaro et al. | 280/732 X |

FOREIGN PATENT DOCUMENTS 0158444  6/1990  Japan ................ 280/728 A

Primary Examiner—Margaret A. Focarino
Assistant Examiner—Peter C. English
Attorney, Agent, or Firm—Charles E. Leahy

[57] ABSTRACT

An air bag assembly is mounted in a vehicle instrument panel recess located below an opening in the instrument panel upper surface which has a removable cover door normally closing the opening. The air bag assembly comprises an inflator, an air bag, a container mounting the inflator at its bottom and housing the folded air bag atop the inflator, and an air bag deployment chute. The deployment chute is a fabric rectangular tube having one end attached to the container around its deployment opening. The deployment chute is folded atop the air bag. A fabric tether connects the lower edge of the chute outer end to the container and is shorter than the tube. Upon actuation of the inflator, the deployment chute forces open the instrument panel door and extends outwardly of the instrument panel opening. The tether forces the chute to arch rearwardly and downwardly of the instrument panel opening. The inflating air bag forces its way through the narrow deployment chute until it emerges from the chute downwardly and rearwardly of the instrument panel and fully inflates. Upon emerging, the inflating air bag forces the chute to retract to a gathered position about the instrument panel opening, thus allowing full inflation of the air bag.

9 Claims, 3 Drawing Sheets

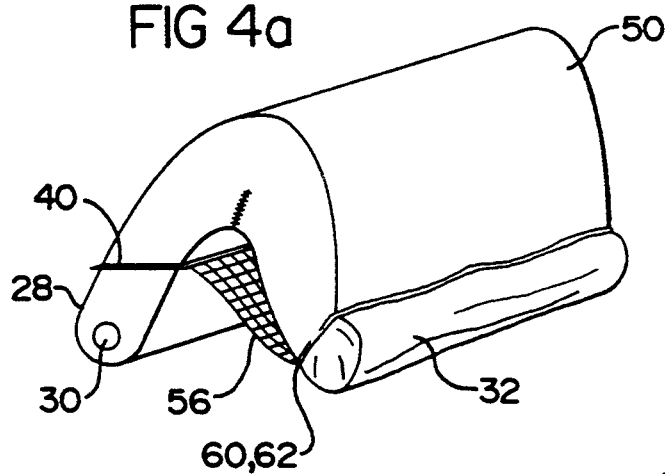
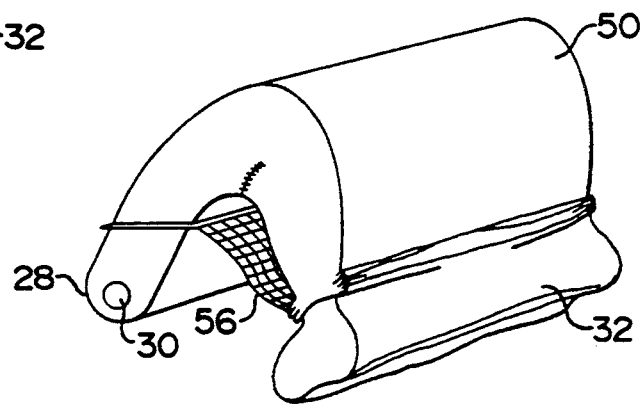
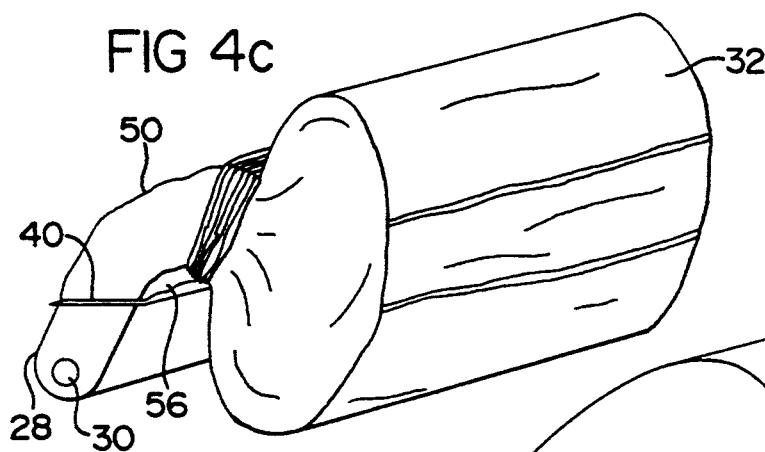
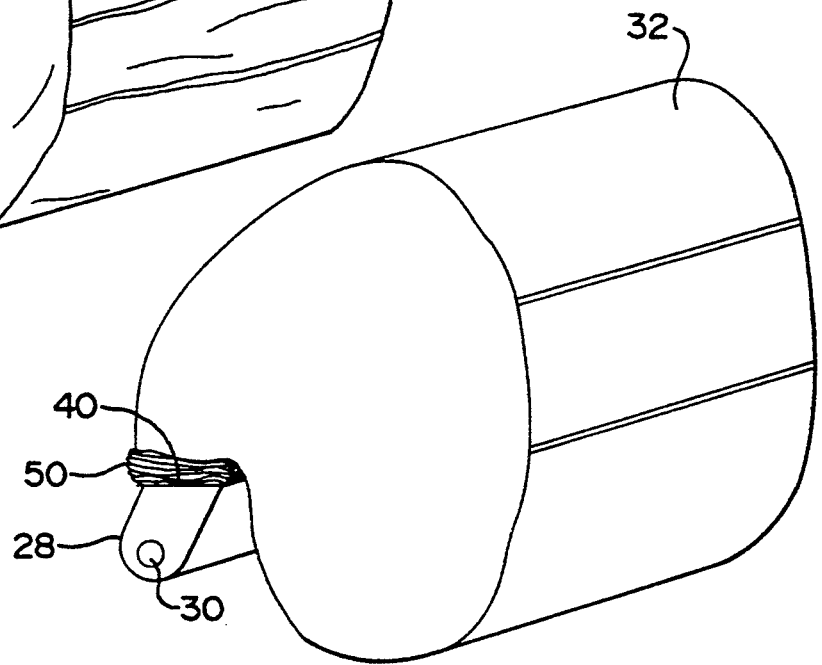

AIR BAG ASSEMBLY WITH DEPLOYMENT CHUTE

BACKGROUND OF THE INVENTION

This invention relates generally to vehicle air bag installations and, more particularly, to a device for controlling deployment of an air bag.

Inflatable occupant restraint systems for passengers of vehicles conventionally comprise an air bag assembly having an inflatable air bag, an inflator and a container for housing the inflator and the air bag. The air bag is folded atop the inflator beneath the open top of the container. This assembly is mounted in a recess in the instrument panel for deployment of the air bag through a deployment opening in the instrument panel. This opening is closed by a cover door.

The instrument panel deployment opening can be located in the front face of the instrument panel or in the upper surface of the panel. Positioning of this opening in the front face of the instrument panel complicates location of the glove box. Consequently, to provide a convenient glove box location, the air bag deployment opening is frequently mounted in the upper surface of the instrument panel.

In some vehicles the air bag cover door comprises a foam pad and skin which are an integral portion of the panel.

The skin includes a tear seam line of weakened panel material along the substrate cutout on three sides to define the door. This tear seam is fractured by the inflating air bag so that the door swings open about its fourth side, which functions as a hinge, to enable the air bag to properly deploy.

In yet other vehicles this cover door is a separate rectangular panel that is flush mounted in a rectangular opening in the surrounding panel area so that it can be opened and completely removed by the deploying air bag upon inflation. This type of door is usually attached to the instrument panel at its forward edge by a hinge or by a tethering device to cause the door to swing open about this attachment out of the path of the deploying air bag.

Upon actuation of the inflator, the air bag begins inflating and exerts an increasing force on the cover door, bursting it open with considerable force. The bag then unfolds and inflates in a manner partially determined by how the bag was originally folded, by the location of the instrument panel deployment opening and by the location of the cover door when open.

With the opening located in the upper surface of the instrument panel, the inflating air bag must deploy initially upwardly and must then deploy rearwardly. Many different methods of folding the air bag have been devised to tailor air bag deployment to a particular vehicle environment. Also, devices have been developed which locate the cover door in a desired position when opened. One of these includes front and side tethers which locate the cover door in a position spaced above the instrument panel and spaced from the windshield. These tethers and the door create a chute which directs deployment of the inflating air bag from the initial vertical movement to rearward movement. These tethers must be quite strong to resist the force exerted continuously by the inflating air bag.

It would be desirable to provide an air bag assembly which provides for deployment of an air bag initially downwardly.

It would also be desirable to provide an air bag assembly which provides a deployment chute to direct air bag deployment rearward that does not require that the cover door have side tethers.

It would be further desirable to provide an air bag assembly which quickly deploys an air bag through an opening in the top of an instrument panel initially downwardly.

SUMMARY OF THE INVENTION

It is therefore an object of this invention to provide an air bag assembly which provides for deployment of an air bag initially downwardly.

It is another object of this invention to provide an air bag assembly which provides a deployment chute to direct air bag deployment rearward that does not require that the cover door have side tethers.

It is a further object to provide an air bag assembly which quickly deploys an air bag through an opening in the top of an instrument panel initially downwardly.

In one aspect, this invention features a deployment chute for an air bag which is mounted beneath the deployment opening of an air bag container, said chute comprising an elongated, open-ended fabric tube having its inner end secured to the container about its deployment opening, and being extensible from a position folded atop the air bag to an extended position outwardly of the opening to guide deployment of the air bag through said passage to emerge from the chute outer end.

Preferably, the tube has a rectangular cross-sectional area significantly smaller than the cross-sectional area of the inflated air bag which deploys through it and includes a tether connecting the chute outer end to the container to arch the tube and position the outer end upon deployment rearwardly and downwardly of the opening.

In another aspect, this invention features an air bag assembly mounted in a vehicle instrument panel having a recess for mounting an air bag assembly below an opening, and a removable cover door for normally closing the opening, wherein the air bag assembly comprises an inflator, an air bag, and a container for housing the air bag and inflator and having a deployment opening adjacent said instrument panel opening. A deployment chute is provided to guide deployment of the air bag, said chute being extendible between a stored position, folded atop the air bag in the container, and an extended position rearwardly of the instrument panel opening.

Preferably, the assembly includes a tether connecting the lower edge of the chute outer end to the container to arch the chute and initially deploy the air bag rearwardly and downwardly of the opening, with the expanding air bag retracting the chute to a gathered position about the opening to enable the air bag to inflate fully.

These and further objects and features will become more readily apparent upon reference to the following detailed description of a preferred embodiment, as illustrated in the accompanying drawings, in which:

BRIEF DESCRIPTION OF THE DRAWINGS

FIGS. 4a, 4b, 4c and 4d are perspective views illustrating sequential extension of the deployment chute and deployment of the air bag.

DETAILED DESCRIPTION OF A PREFERRED EMBODIMENT

Figure 1:
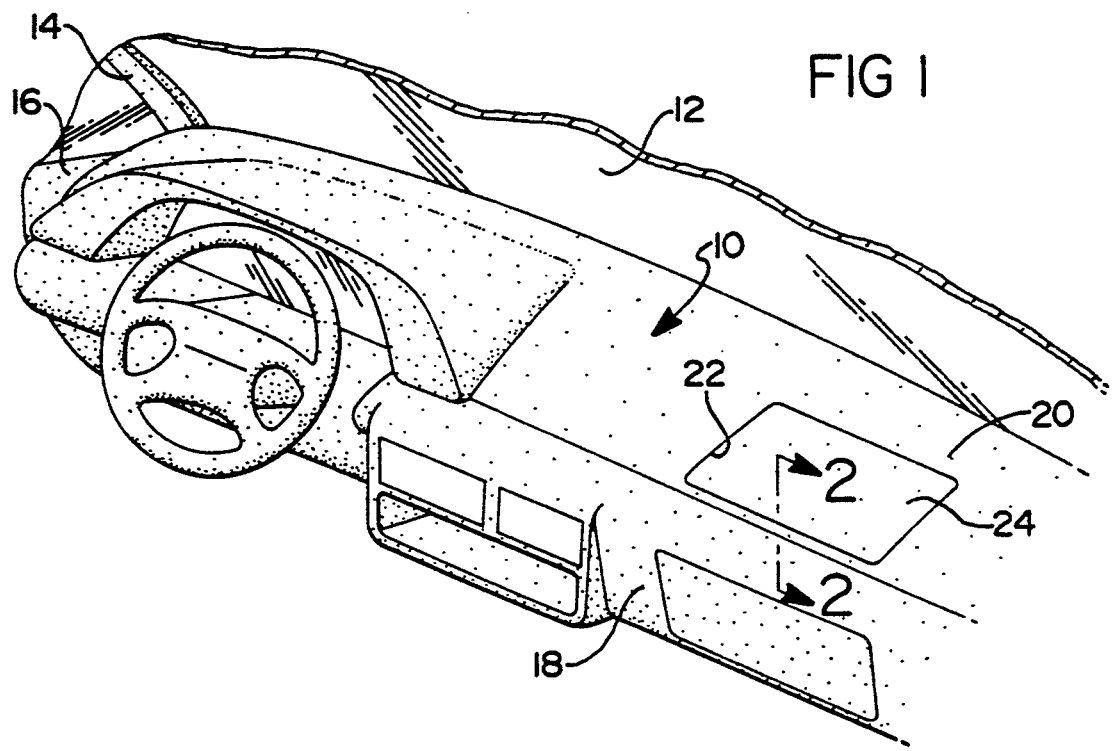
FIG. 1 is a perspective view of a portion of a vehicle interior illustrating the location of an air bag assembly according to this invention.
Figure 2:
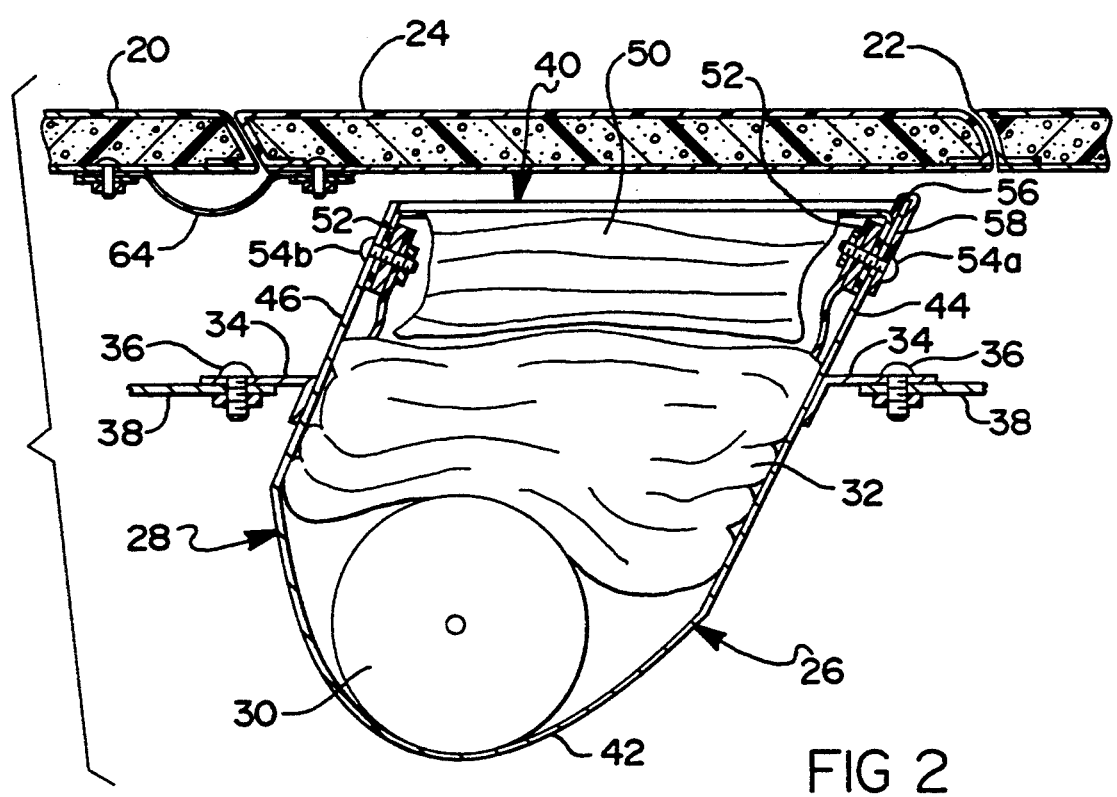
FIG. 2 is an enlarged sectional view taken along the line 2—2 of FIG. 1, illustrating the air bag assembly prior to actuation.

Referring now to FIGS. 1 and 2, a vehicle passenger compartment has an instrument panel 10 that is bounded by a windshield 12, an "A" pillar 14, and a passenger door opening 16. Instrument panel 10 comprises a vertical front panel 18 and a substantially horizontal top panel 20 having an air bag deployment opening 22.

A cover door 24 normally closes deployment opening 22. The instrument panel and cover door are illustrated as comprising a conventional vinyl-covered foam-over-substrate construction. In a closed position, cover door 24 has its exterior surface flush with the surrounding top panel 20.

An air bag assembly 26 comprises a container 28, an inflator 30 and an air bag 32 of nylon or similar material. Inflator 30 and air bag 32 are housed in container 28, which includes apertured side mounting flanges 34. Screws 36 mount the air bag assembly 26 to conventional instrument panel support structure 38. Inflator 30 is a conventional cylindrical device which generates pressure gas when actuated by a control signal supplied by a vehicle-mounted sensor (not shown) in a well-known manner. The generated pressure gas inflates air bag 32 for deployment through a rectangular deployment opening 40 in the top of container 28 into the passenger compartment rearward of instrument panel 10 in a manner according to this invention, later described.

Figure 3:
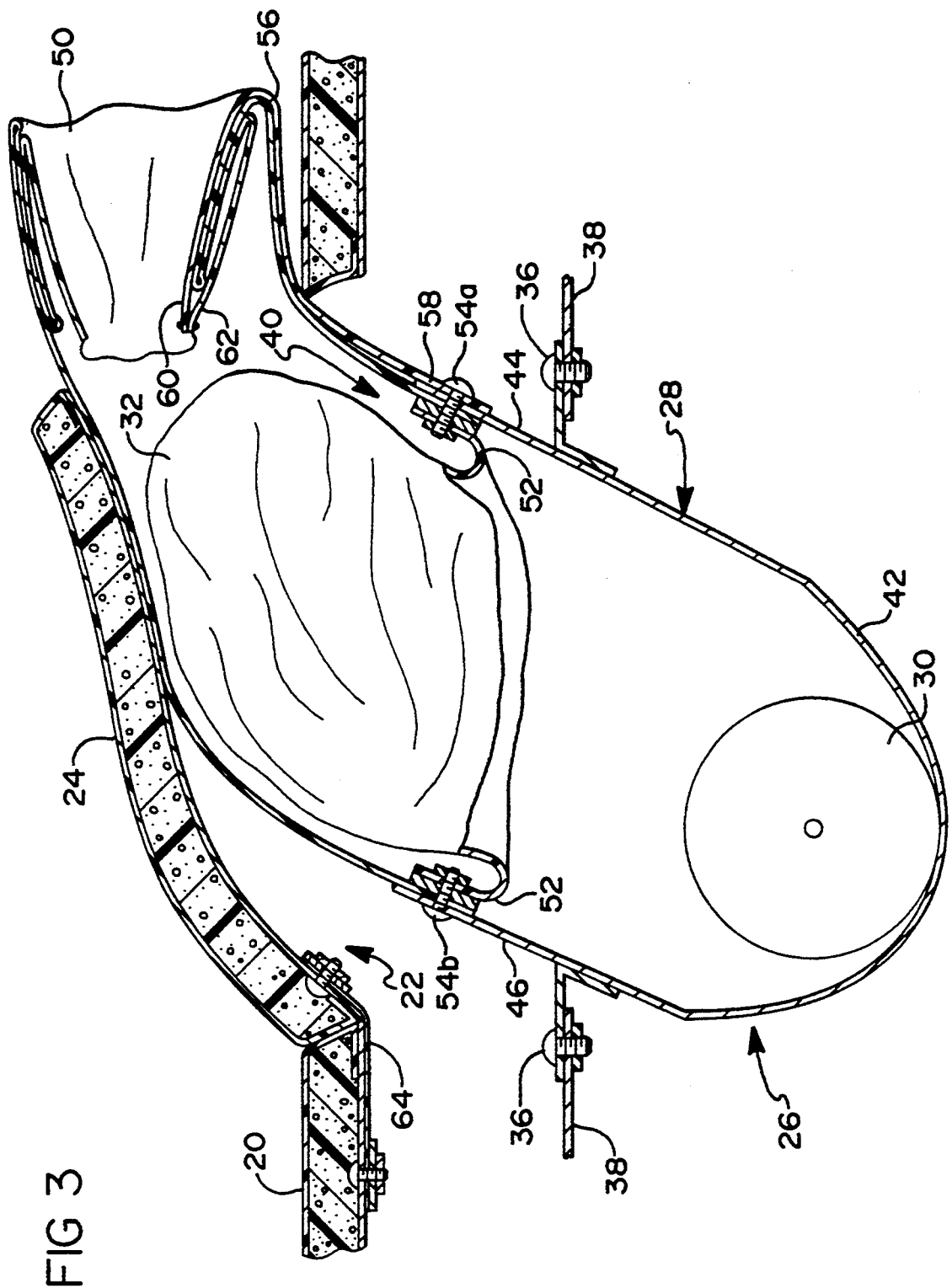
FIG. 3 is a view similar to FIG. 2, but illustrating the air bag assembly during initial extension of the deployment chute, according to this invention, during initial air bag inflation.

Referring to FIGS. 2 and 3, container 28 comprises a part-cylindrical base 42 which opens to a rectangular upper chute comprising front and rear walls 44 and 46 which terminate in rectangular deployment opening 40. The chute houses folded air bag 32, as previously described, and a deployment chute 50, according to this invention.

Chute 50 is a flexible fabric tube, preferably nylon, which is open at both ends and has a cross-sectional area which is dictated by the size of instrument panel deployment opening 22. Chute 50 is significantly smaller than the cross-sectional area of fully-inflated air bag 32. As shown, chute 50 is initially folded or gathered atop air bag 32 and has its inner end 52 secured to chute walls 44 and 46 by fasteners 54a, 54b about the periphery of deployment opening 40.

A tether 56 has its inner end 58 attached to the outside of chute wall 44 by fastener 54a. Tether 56 is a rectangular strip of nylon webbing that has its outer end 60 sewn to the lower edge of the outer end 62 of chute 50. Chute 50 is initially folded back on itself to lie atop air bag 32 below cover door 24, as shown in FIG. 2. Tether 56 is folded in with chute 50.

Operation of air bag assembly 26 will now be described with reference to FIGS. 3, 4a, 4b, 4c and 4d. Upon actuation of inflator 30, air bag 32 will begin inflating and push chute 50 upwardly against door 24. Door 24 will be forced open, pivoting upward about forward hinge 64. This opens a path rearwardly of instrument panel 10 for chute 50 which will continue to unfold and extend ahead of the inflating air bag 32, as shown in FIG. 3, which illustrates air bag assembly 26 approximately 20 milliseconds after actuation of inflator 30.

Chute 50 will continue to extend upwardly and rearwardly, as air bag 32 continues to inflate. Tether 56 is much shorter than the length of chute 50. This restrains outward movement of the lower edge of the end of chute 50 from opening 22. This causes chute 50 to arch upwardly, above instrument panel 10, then downwardly, behind the panel, as shown in FIG. 4a. Since chute 50 has a narrow cross-section, air bag 32 is constrained to expand through narrow chute 50. It will thus deploy much more quickly than it would if unconstrained, as is conventional.

As a result, air bag 32 will begin deploying downwardly when it emerges from the end of chute 50, as shown in FIG. 4b. As previously noted, the cross-sectional area of chute 50 is significantly smaller than the cross-section of the inflated air bag. This relationship constrains air bag 32 to expand quickly through chute 50. When air bag 32 emerges from the outer end of chute 50, it quickly expands and forces the constricting chute 50 to retract, as shown in FIG. 4c until it retracts completely back to a gathered position about opening 22. This enables air bag 32 to inflate fully to the unfettered shape shown in FIG. 4d.

Thus, the use of chute 50 enables air bag 32 to deploy quickly in an initial downward direction (FIG. 4b). Thereafter, chute 50 retracts to enable air bag 32 to inflate to its normal expanded position (FIG. 4d).

By constricting expansion of air bag 32 through chute 50, the force exerted by the air bag on cover door 24 is limited. Thus, chute 50 eliminates the need for side tethers for cover door 24, either to limit displacement of the cover door, or to guide deployment of the air bag.

While only a preferred embodiment has been illustrated and described, obvious modifications thereof are contemplated within the scope of this invention and the following claims. about said deployment opening and having a cross-sectional area significantly smaller than the cross-sectional area of the fully-inflated air bag, said tube being extensible from a position folded atop the air bag to an extended position outwardly of the opening, and a tether connecting the lower edge of the chute outer end to the container to arch the tube upon extension, said tube guiding deployment of the air bag therethrough to emerge from the chute outer end at a position rearwardly and downwardly of the deployment opening.

The embodiments of the invention in which an exclusive property or privilege is claimed are defined as follows:

1. A deployment chute for an air bag which is mounted beneath a deployment opening of an air bag container, said chute comprising an elongated, open-ended fabric tube having its inner end secured to the container 2. In a vehicle instrument panel having a recess for mounting an air bag assembly below an opening, and a removable cover door for normally closing the opening, wherein the air bag assembly comprises an inflator, an air bag, and a container for housing the air bag and inflator and having a deployment opening adjacent said instrument panel opening, the improvement comprising a deployment chute through which the air bag deploys, said chute being a flexible fabric cylindrical tube connected with the container and having a cross-sectional area substantially the same size as the instrument panel opening and being extendible between a stored position folded atop the air bag in the container, and a deployed position, said chute having a length such that in the deployed position the unfolded chute extends substantially through the instrument panel opening rearwardly of the instrument panel and guidably encircles a portion of the air bag, and means to arch the chute upon deployment to initially deploy the air bag in a direction rearwardly and downwardly of the instrument panel opening, thereby directing deployment of the air bag rearwardly of the instrument panel.

3. The improvement of claim 1, including the chute having an outer end and a tether connecting the chute outer end to the container to position the outer end upon deployment.

4. The improvement of claim 3, wherein the tether is connected to the lower edge of the chute outer end, thus causing the chute to arch upon extension and initially deploy the air bag in a direction rearwardly and downwardly of the instrument panel opening.

5. The improvement of claim 4, wherein the chute is flexible and retracts to a position gathered about said deployment opening upon full inflation of the air bag.

6. The improvement of claim 5, wherein the chute has a rectangular cross-section.

7. A deployment chute for an air bag which is mounted beneath a deployment opening of an air bag container, said chute comprising an elongated, open-ended fabric tube with a rectangular cross-section and a cross-sectional area significantly smaller than the cross-sectional area of the fully-inflated air bag and having an inner end secured to the container about the periphery of its deployment opening and an outer end, said chute being extendible from a position folded atop the air bag to an extended position outwardly of the opening, and a tether connecting the chute outer end to the container to position the outer end upon deployment to guide deployment of the air bag through a passage to emerge from the chute outer end.

8. The improvement of claim 7, wherein the air bag container is mounted in an instrument panel opening and at the tether is connected to the lower edge of the tube outer end, thus causing the chute to arch upon extension and initially deploy the air bag in a direction rearwardly and downwardly of the instrument panel opening.

9. The improvement of claim 8, wherein the chute is flexible and retracts to a position gathered about said deployment opening upon full inflation of the air bag.

* * * * *